（12）United States Patent
Woerdeman (10) Patent No.: US 9,428,648 B2
(45) Date of Patent: Aug. 30, 2016

(54) WHEAT GLUTEN BASED COMPOSITIONS AND ARTICLES MADE THEREFROM

(75) Inventor: Dara L. Woerdeman, Merion Station, PA (US)

(73) Assignee: Green Materials, LLC, Merion Station, PA (US)

( * ) Notice: Subject to any disclaimer, the term of this patent is extended or adjusted under 35 U.S.C. 154(b) by 336 days.

(21) Appl. No.: 13/490,428

(22) Filed: Jun. 6, 2012

(65) Prior Publication Data

US 2013/0113138 A1    May 9, 2013

Related U.S. Application Data

(63) Continuation-in-part of application No. PCT/US2011/063282, filed on Dec. 5, 2011.

(60) Provisional application No. 61/419,416, filed on Dec. 3, 2010.

(51) Int. Cl.
| | |
|---|---|
| *C08L 89/00* | (2006.01) |
| *C08L 1/02* | (2006.01) |
| *C08L 97/02* | (2006.01) |
| *C08J 5/04* | (2006.01) |

(52) U.S. Cl.
CPC ........ *C08L 89/00* (2013.01); *C08J 5/04* (2013.01); *C08L 1/02* (2013.01); *C08L 97/02* (2013.01); *C08J 2397/02* (2013.01); *C08L 2205/16* (2013.01)

(58) Field of Classification Search
CPC ........... C08L 89/00; C08L 89/04; C08J 5/00; B29C 46/003
USPC ..................... 264/319, 330, 328.1
See application file for complete search history.

(56) References Cited

U.S. PATENT DOCUMENTS

| | | | | |
|---|---|---|---|---|
| 2,446,304 | A | * | 8/1948 | Roman .......................... 524/14 |
| 4,863,655 | A | * | 9/1989 | Lacourse et al. .............. 264/53 |
| 4,963,422 | A | * | 10/1990 | Katz ..................... C09J 133/08 427/206 |
| 5,665,152 | A | * | 9/1997 | Bassi .................. B29C 45/0001 106/125.1 |
| 2004/0062920 | A1 | * | 4/2004 | Guilbert ................ B27N 3/002 428/295.1 |
| 2004/0202857 | A1 | * | 10/2004 | Singer ..................... B27N 3/00 428/326 |
| 2005/0120915 | A1 | * | 6/2005 | Bowden et al. ........... 106/162.5 |
| 2006/0027941 | A1 | * | 2/2006 | Woerdeman .................. 264/129 |
| 2006/0042506 | A1 | * | 3/2006 | Woerdeman et al. ..... 106/125.1 |
| 2006/0234077 | A1 | * | 10/2006 | Breyer ................... B27N 3/002 428/528 |
| 2007/0020476 | A1 | | 1/2007 | Kintzley et al. |
| 2010/0069533 | A1 | * | 3/2010 | Brady ..................... C08L 97/02 524/13 |
| 2010/0069534 | A1 | | 3/2010 | Wescott et al. |
| 2013/0113138 | A1 | | 5/2013 | Woerdeman |

FOREIGN PATENT DOCUMENTS

| | | |
|---|---|---|
| WO | 2006/132785 A2 | 12/2006 |
| WO | 2012/075489 A1 | 6/2012 |

OTHER PUBLICATIONS

PCT/US11/63282 International Search Report mailed Apr. 3, 2012.
International Search Report mailed Oct. 31, 2013 for International Application No. PCT/US2013/044511.

* cited by examiner

*Primary Examiner* — Yogendra Gupta
*Assistant Examiner* — Ninh Le
(74) *Attorney, Agent, or Firm* — Pepper Hamilton LLP (57) ABSTRACT

Disclosed herein are wheat gluten based compositions having improved mechanical properties as well as articles formed therefrom, and methods of making the same. More particularly, the compositions also include fibrous reinforcing material and may be formed into a variety of products, including but not limited to particle board.

3 Claims, 5 Drawing Sheets

WHEAT GLUTEN BASED COMPOSITIONS AND ARTICLES MADE THEREFROM

CROSS-REFERENCE TO RELATED APPLICATIONS

This application claims priority to U.S. provisional patent application 61/419,416, filed on Dec. 3, 2010, entitled WHEAT GLUTEN BASED COMPOSITIONS AND ARTICLES MADE THEREFROM, and is a continuation-in-part application of International PCT Application serial no PCT/US11/063,282, filed Dec. 5, 2011, of the same title, each of which is hereby incorporated by reference in its entirety.

STATEMENT REGARDING FEDERALLY SPONSORED RESEARCH AND DEVELOPMENT

This work was funded at least in part by National Science Foundation Phase II SBIR grant #0923863.

BACKGROUND

The present invention relates to wheat gluten based compositions, articles made therefrom, and methods for making the same. More particularly, the invention relates to low-density articles made from wheat gluten, reinforcing fibrous materials, and other optional components. The invention also relates to the compositions used to make such articles as well as methods of making such articles.

Wheat gluten protein has been used in a variety of compositions, adhesives, formed articles to varying degrees of success. Due to the highly complex nature of proteins, it is difficult to predict what effect a given addition or change will have on the process and/or the properties of the resultant product, since the reactions involved are delicate and sensitive to minor changes in processing conditions and to minor changes to the process itself. In the manufacture of wood composites, applicants have found compositions and processes that achieve better mechanical properties with less gluten binder or at least similar mechanical properties with less gluten binder. Thus, the gluten based compositions and articles described herein require less material, and are thus more efficient in terms of both cost and performance.

There is a demand for such gluten based compositions and articles in a variety of fields.

SUMMARY

The description herein is meant to be exemplary in nature only. Those of skill in the art will recognize from the teachings herein variants that are within the scope and spirit of the disclosure herein.

Some embodiments provide a composition comprising wheat gluten and reinforcing fibrous material. Some embodiments provide a composition comprising wheat gluten; reinforcing fibrous material, and urea. Some embodiments provide a composition comprising wheat gluten, reinforcing fibrous material, and lactic acid. In some embodiments, the reinforcing fibrous material is selected from a wood-based product such as wood chips or sawdust.
In some embodiments, the composition comprises:
about 50% to about 90% wheat gluten; and
about 10% to about 50% reinforcing fiber.
In some embodiments, the composition comprises:
about 10% wheat gluten; and
about 90% reinforcing fiber.
In some embodiments, the composition comprises:
about 8-10% wheat gluten;
about 88-92% reinforcing fiber;
and about 1% to about 4% urea.
In some embodiments, the composition comprises:
about 6% to about 10% wheat gluten;
about 80% to about 90% reinforcing fiber;
and about 6% to about 10% lactic acid.
In some embodiments, the composition is useful for forming wood composite materials.
In some embodiments, the composition is formaldehyde free.
In some embodiments, the urea is provided as an aqueous solution.
In some embodiments, the composition is employed in a formed article having a density less than about 1.0.
In some embodiments, the fibrous material has natural hollows. In some embodiments, the fibrous material encapsulates air within its hollows.

Some embodiments provide a method of making a formed article, the method comprising mixing a reinforcing fibrous material with water to yield a first resultant mixture, mixing the first resultant mixture with wheat gluten to yield a second resultant mixture, and shaping and curing the second resultant mixture into a formed article.

In some embodiments, the wheat gluten, water, and fibrous material are mixed at a ratio of about 0.1:0.1:1.0.

In some embodiments, the mixing of the reinforcing fibrous material with water occurs prior to mixing with wheat gluten. Some embodiments further comprise mixing one or more additional components selected from urea, guanidine hydrochloride, one or more organic acid, maleic anhydride, or combinations thereof, prior to mixing with wheat gluten.

In some embodiments, the urea is added as an aqueous solution instead of the water.

These and other embodiments will be more apparent in light of the detailed description below.

DETAILED DESCRIPTION

Disclosed herein are articles comprising wheat gluten and reinforcing fibrous material, as well as compositions used in the forming process, and the processes themselves.

Disclosed herein is a low-density article comprising wheat gluten and fibrous material. The low-density is achieved at least in part by allowing entrained air to remain within the article during processing. Due to the gas holding properties of wheat gluten, it is believed that the wheat gluten surrounds and encapsulates the fibrous material without infiltrating the void within the fibrous material, thereby forming a closed-foam structure.

In some embodiments, optional components such as urea, guanidine hydrochloride, organic acids such as but not limited to lactic acid, sorbic acid, and citric acid, and maleic anhydride are also used. As described further below, addition of such materials unexpectedly improved one or more mechanical properties of the articles formed.

The articles produced by the compositions and methods described herein can take nearly any form. The properties of the final product can be tailored to make it suitable for many uses, particularly as a replacement for more traditional materials, such as plastic, other polymeric materials, and some building materials, such as wood, plywood, oriented strand board, medium density fiberboard, low density fiberboard, other manufactured wood products, paper products and cardboard.

When natural fibers are employed, as well as other optional non-fiber fillers such as but not limited to porous silica, silica beads, and the like, the article is also biodegradable, which makes it a more environmentally agreeable option compared to other materials suitable for molding. In accordance with some embodiments of the invention, the article may be formed through traditional or modified traditional techniques including, but not limited to, open molding, compression molding, vacuum forming, transfer molding, extrusion molding blow molding, rotational molding, thermoforming, and centrifugal molding.

"Low-density" as used herein means having a density of less than about 1. That is, a low-density article has a density less than water at normal temperature and pressure; the article will float.

The articles formed from the wheat gluten compositions and methods described herein can be any of a variety of articles, including molded objects, sheet objects, etc. Particularly contemplated herein are items typically made from plastics, such as utensils, food containers, and the like, as well as sheet goods such as boards, particle board, drywall, etc. or replacement products therefor.

Wheat gluten is readily available from a number of commercial suppliers. Wheat gluten may be purchased as a powder (e.g. Vital Wheat Gluten Concentrate—Bulk 50 Pound Bag by Honeyville Farms, et al.) In some embodiments of the invention it is employed as a powder with minimal or no addition of water. In other embodiments, the wheat gluten may be mixed with a quantity of water to achieve a workable mixture similar to a dough. Each has its own advantages and is well-suited to various forming techniques such as open molding, closed molding, vacuum forming, centrifugal molding, and other techniques.

Applicants believe, without being bound to the theory, the high viscosity, and high molecular weight of the wheat gluten compositions substantially and effectively limit or prevent the wheat gluten from infiltrating the fibrous material. Thus, instead of displacing the gas trapped within the fibers, through such infiltration, wheat gluten dough compositions, with their gas holding capability, form a closed-foam structure, which results in a reduced density without compromising strength. Ideally, the wheat gluten compositions are also of such viscosity that it envelops and substantially conforms to the exterior shape of the individual fibers with the creation of a minimal number of voids between the gluten and the fibers. In some embodiments, there are substantially no voids except those within the fibers. The resultant product resembles a closed-cell foam, with the closed cells essentially being formed by interior hollows of the fibrous material. Reducing the number and size of voids outside the fibers increases the strength of the final product. Additionally, the hollows within the fibrous material contribute to the flexibility of the final product.

In some embodiments, water (or aqueous urea) is added first to the reinforcement fibers it is believed this allows water (or other liquid) to be more uniformly distributed, and not just absorbed by the gluten powder. Once the gluten powder takes up water, there is a tendency for it to form clumps. In the formulations disclosed herein, minimal amounts of water can be used, thereby reducing the need to remove excess water, which takes time and/or heat and therefore is costly—not to mention it may deteriorate the product.

Other embodiments contemplate voids in addition to those within the fibrous material, provided that the resultant properties are desirable. Although voids in the wheat gluten are less desirable, and easily avoided through manipulating the gluten composition, voids created by the network of fibers, particularly where one fiber crosses or is adjacent to another, can be desirable and can add to the low-density effect and may be used to affect various properties such as flexibility and brittleness. Such embodiments may be more susceptible to the infiltration of fluids, such as water, and may have an altered strength profile. Thus, we have described three different types of voids.

First, the fibrous material itself defines a void within the fiber. Although this can be thought of as a hollow in a tube-like fiber, it is not so limited. Such voids may also take the form of internal pockets or incompletely hollow tubes. The importance of these voids is that they entrap gas within the fiber either because it is naturally trapped within the fiber (a closed void) or upon mixing with wheat gluten, the wheat gluten seals the void with the entrapped gas. These types of voids are important and can be controlled based upon the amount and type of fiber used, and will be referred to as "hollows" for convenience herein. Although "hollows" appears as plural, it is specifically meant to include a singular hollow within an individual fiber—such as the void formed in a tube structure.

Second, voids can be formed at the interstitial spaces formed by the network of fibers. Particularly, as fibers cross over or near each other, small interstitial spaces are formed. Depending on the nature of the fiber and the fibrous network formed, the wheat gluten may have a difficult time entering these spaces, thus creating "interstitial voids." Depending upon the application, these may also be beneficial. Because the wheat gluten composition is conformable, is can be massaged into these spaces if desired, thereby controlling the amounts of open interstitial space, depending upon the desired final characteristics and other properties.

Third, there can be voids within the wheat gluten itself or between the wheat gluten and a fiber. These voids are preferably minimized and avoided because they generally are thought to weaken the structure by minimizing contact with the fibers and for other reasons. It is, however, contemplated, that some applications would be tolerant of some level of these types of voids.

Thus, various embodiments of the invention may have any combination of the three types of voids, depending upon the processing technique employed and the desired end product.

The moldable and conformable nature of the wheat gluten compositions during processing is believed to achieve good contact between the gluten and the fiber as discussed above, but also protects the fibers and their important hollows from compression. During processing and forming, the material can come under considerable pressure through rolling, compression, and/or other forces. In some instances, wheat gluten is employed in its powder form, with the addition of little to no additional water. As seen in example 4, articles made from such compositions are among the strongest of those tested. When powder is used, higher temperature and pressure may be employed compared to that needed in forming articles from wheat gluten dough materials. Accordingly, wheat gluten powder is better suited to compression moldings than to, e.g., open molding.

Either wheat gluten dough or wheat gluten powder may be used depending upon the final desired characteristics, the forming method to be used and other factors.

Through choice of fibrous material, and its quantity, the density of the final product can be manipulated and controlled.

In some examples, the fibrous material is hydrophobic. In others, the fibrous material may be hydrophilic, but treated to obtain hydrophobic properties via methods known to those of skill in the art. Examples of suitable fibrous materials include but are not limited to:

Natural fibers including those produced by plants, animals, and geological processes. They are biodegradable over time. They can be classified according to their origin: examples include vegetable fibers, wood fiber, animal fibers, and mineral fibers, Vegetable fibers are generally based on arrangements of cellulose, often with lignin: examples include cotton, hemp, jute, flax, ramie, and sisal.

Wood fiber, distinguished from vegetable fiber, is from tree sources. Forms include ground wood, thermo-mechanical pulp (TMP), and bleached or unbleached Kraft or sulfite pulps. Kraft and sulfite, also called sulphite, refer to the type of pulping process used to remove the lignin bonding the original wood structure, thus freeing the fibers for use in paper and engineered wood products such as fiberboard. Wood chips, such as oak chips, may also be used. Sawdust of various individual species or mix of species, including sawdust reclaimed from the timber industry and woodcraft industries, can also be used.

Animal fibers consist largely of particular proteins. Instances include spider silk, sinew, catgut, wool and hair such as cashmere, mohair, and angora, fur such as sheepskin, rabbit, mink, fox, beaver, etc. Mineral fibers include asbestos. Asbestos is the only naturally occurring long mineral fiber. Short, fiber-like minerals include wollastonite, attapulgite, and halloysite.

Wood fibers are particularly well suited for use in the compositions, methods, and products contemplated herein.

Natural fibers are preferred because they are biological and can be reclaimed and recycled from other uses. For example, sawdust and other wood fibers can be obtained as scrap or waste from other industries. In today's world, products made from such fibers are environmentally friendly on three fronts. The product is made from a reclaimed or recycled material. The product often replaces a synthetic (e.g. plastic) product. The product itself is biodegradable.

Synthetic or man-made fibers generally come from synthetic materials such as petrochemicals. But some types of synthetic fibers are manufactured from natural cellulose, including rayon, modal, and the more recently developed Lyocell. Cellulose-based fibers are of two types, regenerated or pure cellulose such as from the cupro-ammonium process and modified cellulose such as the cellulose acetates.

Fiber classification in reinforced plastics falls into two classes: (i) short fibers, also known as discontinuous fibers, with a general aspect ratio (defined as the ratio of fiber length to diameter) between 20 to 60, and (ii) long fibers, also known as continuous fibers, the general aspect ratio is between 200 to 500.

Cellulose Fibers

Cellulose fibers are a subset of man-made fibers, regenerated from natural cellulose. The cellulose comes from various sources. Modal is made from beech trees, bamboo fiber is a cellulose fiber made from bamboo, seacell is made from seaweed, etc.

Mineral Fibers

Mineral fibers can be particular strong because they are formed with a low number of surface defects.

Fiberglass, made from specific glass, and optical fiber, made from purified natural quartz, are also man-made fibers that come from natural raw materials, silica fiber, made from sodium silicate (water glass) and basalt fiber made from melted basalt.

Metallic fibers can be drawn from ductile metals such as copper, gold or silver and extruded or deposited from more brittle ones, such as nickel, aluminum, or iron.

Carbon fibers are often based on oxydized and carbonised polymers, but the end product is almost pure carbon.

Polymer Fibers

Polymer fibers are a subset of man-made fibers, which are based on synthetic chemicals (often from petrochemical sources) rather than arising from natural materials by a purely physical process. These fibers may be made from:

polyamide nylon,
PET or PBT polyester
phenol-formaldehyde (PF)
polyvinyl alcohol fiber (PVA)
polyvinyl chloride fiber (PVC)
polyolefins (PP and PE)

acrylic polyesters, pure polyester PAN fibers are used to make carbon fiber by roasting them in a low oxygen environment. Traditional acrylic fiber is used more often as a synthetic replacement for wool. Carbon fibers and PF fibers are noted as two resin-based fibers that are not thermoplastic, most others can be melted.

Aromatic polyamides (aramids) such as Twaron, Kevlar, and Nomex thermally degrade at high temperatures and do not melt. These fibers have strong bonding between polymer chains Polyethylene (PE), eventually with extremely long chains/HMPE (e.g. Dyneema or Spectra).

Elastomers can even be used, e.g., spandex although urethane fibers are starting to replace spandex technology.

Polyurethane Fiber

Coextruded fibers have two distinct polymers forming the fiber, usually as a core-sheath or side-by-side.

Microfibers

Microfibers in textiles refer to sub-denier fiber (such as polyester drawn to 0.5 dn). Denier and Detex are two measurements of fiber yield based on weight and length. If the fiber density is known you also have a fiber diameter, otherwise it is simpler to measure diameters in micrometers. Microfibers in technical fibers refer to ultra-fine fibers (glass or meltblown thermoplastics) often used in filtration. Newer fiber designs include extruding fiber that splits into multiple finer fibers. Most synthetic fibers are round in cross-section, but special designs can be hollow, oval, star-shaped or trilobal. The latter design provides more optically reflective properties. Synthetic textile fibers are often crimped to provide bulk in a woven, non-woven or knitted structure. Fiber surfaces can also be dull or bright. Dull surfaces reflect more light while bright tends to transmit light and make the fiber more transparent.

Very short and/or irregular fibers have been called fibrils. Natural cellulose, such as cotton or bleached kraft, show smaller fibrils jutting out and away from the main fiber structure.

Combination of one or more fibrous materials may also be used depending upon their properties, and the desired properties of the final product.

Regardless of the type of fiber or fibers used, fibers that are best suited to use in the compositions and methods disclosed herein are those fibers that naturally absorb and release liquid readily. The type of fibers chosen is directly related to the desired outcome or application, and the material has been shown to exhibit good properties whether the fibers are short or long. The fibers themselves define a hollow within which gas, such as air, can be entrapped. Hollow fibers already have gas trapped in them. If the fibers are solid or do not already have a way for gas to be inside them, the gas can be introduced during the mixing process.

Under normal conditions, the gas entrapped within the fibrous material is air. However, for certain applications, it may be desirable to prepare the materials in an atmosphere other than air. In some instances, any gas entrapped within the fibrous material or the final article may eventually be displaced by ambient air.

In some embodiments, the amount of trapped gas is from about 0.5% to about 50% by volume of the final product. In some embodiments, the amount of trapped gas is from about 0.5% to about 40% by volume of the final product. In some embodiments, the amount of trapped gas is from about 0.5% to about 30% by volume of the final product. In some embodiments, the amount of trapped gas is from about 0.5% to about 20% by volume of the final product. In some embodiments, the amount of trapped gas is from about 0.5% to about 10% by volume of the final product. In some embodiments, the amount of trapped gas is from about 0.5% to about 5% by volume of the final product. In some embodiments, the amount of trapped gas is from about 1% to about 5% by volume of the final product. In some embodiments, the amount of trapped gas is from about 5% to about 20% by volume of the final product. In some embodiments, the amount of trapped gas is from about 5% to about 10% by volume of the final product.

In some embodiments, a composition for use in forming articles comprises:
  about 10 to about 120 g of fibrous material;
  about 3 to about 150 g wheat gluten powder; and
  optionally about 2.5 mL to about 205 mL water (deionized).

When using vacuum forming techniques a wetter formulation is suitable, since the material is formed into a sheet and vacuumed into the desired form. Such processes can employ a composition comprising:
  about 40 g to about 230 g water (deionized);
  about 40 g to about 135 g wheat gluten powder; and
  about 10 g to about 90 g fibrous material.

Add just enough water to promote mixing and uniformity, but not too much so that drying is inhibited. In some embodiments, the composition comprises
  from about 10% to about 90% wheat gluten powder;
  from about 10% to about 90% reinforcing fiber; and
  from 0 to about 50% water.

In some embodiments, the composition comprises
  from about 50% to about 80% wheat gluten powder;
  from about 20% to about 50% reinforcing fiber; and
  from 0 to about 50% water.

In some embodiments, the composition comprises
  from about 60% to about 70% wheat gluten powder;
  from about 30% to about 40% reinforcing fiber; and
  from 0 to about 50% water.

In some embodiments, the composition comprises:
  about 65% wheat gluten powder; and
  about 35% reinforcing fiber.

The relative percentages of component parts will depend upon several factors, including the type of fiber, the end application, and the processing technique.

In some embodiments, additional optional components may be added, including glycerin, bentonite powder, to achieve various properties, such as elasticity, ductility, strength, durability, etc.

Optional ingredients include, but are not limited to, dyes, fillers, antioxidants, additional plasticizers, emulsifiers, and other compounds that impart a beneficial property to the wheat gluten compositions, e.g., more facile handling or improved film properties, like enhanced water resistance. Examples of optional ingredients include organic and inorganic dyes to impart a color to the wheat gluten compositions. Fillers, like titanium dioxide, can be added to the wheat gluten to impart opacity and/or strength to the wheat gluten compositions. Other optional ingredients include known plant protein plasticizers and antioxidants. Individual optional ingredients are present in a sufficient amount to perform their intended function, typically 0% to about 5%, and preferably 0% to about 2%, by weight of the wheat gluten compositions.

EXAMPLES

Examples 1-13

The basic composition of matter comprises commercial wheat gluten, reinforcement (e.g. natural fiber), and air (inside the reinforcement). The actual ratios of ingredients will depend on the characteristics of the reinforcement—fiber size, size distribution, how heterogeneous they are, their mechanical properties, and the desired properties of the end product.

In Examples 1-13, the wheat gluten powder and water, when present, was first mixed into a dough and the reinforcement fibers added to the dough and mixed. Compression molding was used to mold 10 cm×10 cm plaques, although other molding methods may also be used. Table 1 below sets out the composition of the various examples, along with process time, temperature and applied pressure. Table 2, further below, sets forth some measured properties. Example 13 is a control, using only wheat gluten powder, without reinforcing fibers.

TABLE 1

| Ex | Composition of starting material | Processing method | Process Time | Process Temp | Applied Load | Average Flexural Strength | Standard Dev |
|---|---|---|---|---|---|---|---|
| 1 | 36.47 grams oak wood chips, 7.51 grams commercial wheat gluten (Roquette Freres, Lestren France), 5 mL deionized water | compression molding | 7 minutes | 230 F. | 5-10 Mpa | 3.84 MPa | 1.83 MPa |
| 2 | 36.47 grams oak wood chips, 7.51 grams commercial wheat gluten (Roquette Freres, Lestren France), 5 mL deionized water | compression molding | 15 minutes | 230 F. | 5-10 Mpa | 11.9 MPa | 1.47 MPa |
| 3 | 36.47 grams oak wood chips, 7.53 grams commercial wheat gluten (Roquette Freres, Lestren France), 5 mL deionized water | compression molding | 9 minutes | 230 F. | 5-10 Mpa | 15.6 MPa | 1.42 MPa |
| 4 | 36.47 grams oak wood chips, 7.51 grams commercial wheat gluten (Roquette Freres, Lestren France) | compression molding | 27 minutes | 230 F. | 5-10 Mpa | 28.6 MPa | 2.98 MPa |
| 5 | 36.47 grams oak wood chips, 7.51 grams commercial wheat gluten (Roquette Freres, Lestren France), 2.5 mL deionized water | compression molding | 37 minutes | 230 F. | 5-10 MPa | 18.7 MPa | 4.27 MPa |
| 6 | 36.47 grams oak wood chips, 7.53 grams commercial wheat gluten (Roquette Freres, Lestren France), 2.5 mL deionized water | compression molding | 20 minutes | 230 F. | 5-10 MPa | 10.4 MPa | 2.46 MPa |
| 7 | 36.47 grams oak wood chips, 7.53 grams commercial wheat gluten (Roquette Freres, Lestren France), 12 mL deionized water | compression molding | 26 minutes | 230 F. | 3-7 MPa | 8.86 MPa | 3.34 MPa |

TABLE 1-continued

| Ex | Composition of starting material | Processing method | Process Time | Process Temp | Applied Load | Average Flexural Strength | Standard Dev |
|---|---|---|---|---|---|---|---|
| 8 | 36.87 grams oak wood chips, 11.57 grams commercial wheat gluten (Roquette Freres, Lestren France), 15 mL deionized water | compression molding | 18 minutes | 230 F. | 4-7 MPa | 13.0 MPa | 1.51 MPa |
| 9 | 33.51 grams oak wood chips, 10.52 grams commercial wheat gluten (Roquette Freres, Lestren France), 13 mL deionized water | compression molding | 25 minutes | 230 F. | 6-8 MPa | 19.7 MPa | 4.57 MPa |
| 10- | 36.47 grams oak wood chips, 3.66 grams commercial wheat gluten (Roquette Freres, Lestren, France), 7 mL deionized water | compression molding | 33 minutes | 230 F. | 5-10 MPa | 5.39 MPa | 2.16 MPa |
| 11 | 112 grams Alabama River Cellulose Southern Mixed Hardwood Kraft Pulp, 20 grams commercial wheat gluten (Roquette Freres, Lestren France), deionized water (roughly 30 mL) | compression molding | 32 minutes | 230 F. | 5-10 MPa | — | — |
| 12 | 112 grams Alabama River Cellulose Southern Mixed Hardwood Kraft Pulp, 20 grams commercial wheat gluten (Roquette Freres, Lestren France), deionized water evaporated beforehand | compression molding | 28 minutes | 230 F. | 5-10 MPa | — | — |
| 13 | 62 grams of Vital Wheat Gluten powder (MWG Ingredients, Inc.) | compression molding | 20 minutes | 290 F. | 5-10 MPa | — | — |

Examples 14-16

Three additional samples were made by first mixing the reinforcement fibers with water and then adding the wheat gluten powder. A Cuisinart® food processor was used to mix the ingredients. By adding the water to the fibers and blending BEFORE combining with the wheat gluten powder good adhesion of the gluten powder to the wood fibers is achieved. The gluten powder has a significantly higher density than the wood fibers. If the fibers are not wet first, the powder is more likely to fall to the bottom of the mixing bowl (or chamber), inhibiting formation of a homogeneous mixture. In traditional processes, the adhesive is a liquid and is applied directly to the fibers as they are being spun (e.g. in some kind of mixer or rotating drum). Here, water is used to convert the wheat gluten powder into an "adhesive" with a higher solids content than most adhesives. In these three cases, 65% (w/w) wood fibers and 35% (w/w) commercial wheat gluten were used. Other weight ratios are also possible.

Example 14

Ingredients that went into mixture: 36.46 g wood fibers supplied by Georgia Pacific, 15 mL deionized water, and 20.02 g commercial wheat gluten (Roquette Freres, Lestren, France)
Compression molding temp: 230 F
Load: 3-7 MPa
Total molding time: 15 minutes

Example 15

Ingredients in mixture: 36.46 g wood fibers supplied by Georgia Pacific, 20 mL deionized water, and 20.02 g commercial wheat gluten (Roquette Freres, Lestren, France)
Compression molding temp: 230 F
Load: 3-7 MPa
Total molding time: 10 minutes

Example 16

Ingredients in mixture: 36.46 g wood fibers supplied by Georgia Pacific, 20 mL deionized water, and 20.03 g commercial wheat gluten (Roquette Freres, Lestren, France)
Compression molding temp: 230 F
Load: 3-7 MPa
Total molding time: 26 minutes
Test results are not presently available

Examples 17-53

Examples 17-53 were made with vacuum forming techniques in mind Unlike other molding techniques, in vacuum forming techniques, a sheet material is formed which can be pulled into a mold via vacuum pressure. All ingredients, except the fibrous material (saw dust) were mixed and then rolled over a bed of saw dust to form the sheet material to form a sheet for vacuum forming Stickiness of the sheet can be controlled through controlling the amount of ingredients used.

The set up for these exemplary products was tested using traditional materials using both male and female molds.
A. For Machine 1, Female Mold 1
West System Epoxy
11 g #104 Adhesive Filler
79 g #105 Resin
14 g #205 Hardener
130° F. (54.4° C.)
28" Hg
1 hour, 34 minutes
This test was to measure the function of the new machine with materials of known characteristics.
B. Male Mold 1
0.020 Styrene sheet, approx. 16 square-inch material used to form over the mold in typical vacuum forming method to test mold with known technique and material.
3 Jan. 2010

Example 17

60 g water, 40 g W.G., ~10 g sawdust. Materials mixed in container and then rolled out on bed of sawdust with a rolling pin. Material was divided in half. One half was put in a plastic bag to consolidate for 15 minutes. After rolling out both samples it was observed that the one that had consolidated seemed better mixed and more easily manipulated (less sticky, more readily formed).

Example 18

40 g W.G., 60 g water, 4 g glycerol, 20 g sawdust. Batch rolled with rolling pin, folding in half frequently, in a layer of sawdust (~15 g total added). Then the material was put through a slip roller, with sawdust added to reduce stickyness (~20 g). Material was pulpy and patchy, unlike previous batch. Half was put in a plastic bag and remoistened (>5 g water) and left in a refrigerator for 12 hours. Then it was rolled out as described above, with perhaps 5 g of sawdust added to reduce sticking. Average Flexural Strength: 17.6 MPa; Standard Dev.: 1.75 MPa.

Example 19

60 g W.G., 40 g water, 1 g glycerol, 20 g sawdust. Material kneaded in a plastic bag and left to condition for 30 minutes at room temperature, then rolled as described in 18.

Example 20

Air dry, female mold 1. 200 g water, 133 g W.G., 3 g glycerol, 59 g sawdust. Material handled as above, but sawdust measured first and added during rolling so that amount could be recorded. Material was draped into mold. Trim was reconstituted by adding ~5 g water and re-rolling. When this material was draped into another mold, it behaved similarly (stretched well, but some tearing).

Example 21

Air dry, 200 g water, 133 g W.G., 9 g glycerol, 55 g sawdust. Mixed and conditioned in plastic bag without sawdust.

Example 22

The material was rolled out without conditioning, with only the amount of sawdust added to prevent sticking (~20 g).

Examples 23, 24

200 g water, 133 g W.G., 9 g glycerol, 55 g sawdust. Batch divided; both conditioned as above, and 5a removed after 6 hours (5 left for 9 hours). Material rolled out as described above. Some of 5a flattened with a household iron on 'dry' setting.

Example 25

200 g water, 133 g W.G., 12 g glycerol, 55 g sawdust. Conditioned 3 hrs in bag, rolled out with rolling pin, then with slip roller.

Example 26

200 g water, 143 g W.G., 9 g glycerol, 55 g sawdust. Processed as Example 25. This batch was tested on a mechanical press and with vacuum forming techniques. It had been refrigerated until testing. Various bowl and shapes were attempted and manipulated to enhance drying and stability over three days.

Example 27

200 g water, 133 g W.G., 5 g glycerol, 55 g sawdust, processed as Example 25.

Example 28

60 g water, 40 g W.G., 2 g glycerol, 55 g sawdust. Processed as Example 27.

Example 29

202 g water, 133 g W.G., 4 g glycerol, 55 g sawdust. Processed as Example 28.

Example 30

200 g water, 133 g W.G., 4 g glycerol, 55 g sawdust. Processed as Example 29. Sample was divided and one part air dried and one part forced dried with heated air

Example 31

200 g water, 133 g W.G., 4 g glycerol, 25 g. sawdust (added gradually). Batch refrigerated after initial rolling until 22 February. Then 18 g sawdust added while rolling. Batch divided into 4 equal sections, with each rolled again. Then each was put in mechanical press for 15 minutes and returned to refrigerator.

Example 32

200 g water, 133 g W.G., 4 g glycerol, 75 g sawdust. Mixed in beaker and then rolled out on slip roller.

Example 33

200 g water, 133 g W.G., 4 g glycerol, 50 g sawdust. Mixed as Example 32.

Example 34

40 g water, 40 g W.G., 1 g glycerol. Mixed as Example 33.

Example 35

200 g water, 120 g W.G., 3 g glycerol, 50 g sawdust. Mixed in Globe mixer 5 minutes on #3 setting without sawdust; then added sawdust and mixed another 10 minutes on #3 setting.

A second batch was also marked Example 35 as it was added to the first and mixed together) 30 g water, 3 g glycerol, 40 g sawdust. The mixture was then run repeatedly through the Somerset Sheeter (top rollers only).

Example 36

200 g water, 120 g W.G., 30 g citric acid, 60 g sawdust. First all dry ingredients were mixed together by hand in a beaker, and then water was added and the batch mixed on Globe mixer for 10 minutes on #3 setting. Then batch rolled in Somerset Sheeter as in Example 35.

Example 37

200 g water, 120 g W.G., 3 g glycerol, 255 g sawdust. Mixed 10 minutes on Globe #3 with only 55 g sawdust, then added 200 g sawdust and mixed for 10 minutes on #2, and then another 10 minutes on #3, and another 10 minutes on #1. Rolled out as in Example 36.

Example 38

200 g water, 120 g W.G., 3 g citric acid, 4 g glycerol, 150 g sawdust. Water, citric acid and glycerol mixed in a beaker and microwaved for 1 minute. Wheat gluten added and mixed in Globe for 10 minutes on #3. Then 50 g sawdust added and mixed 5 min. on #3. This step repeated two more times, with the last one mixed on #1 as it had become too stiff to run at #3. Then rolled out as in Example 16.

Example 39

200 g water, 120 g W.G., 4 g glycerol, 3 g citric acid, 200 g sawdust. Mixed as Example 38 except sawdust added in two 100 g stages and mixed on #1 setting. Average Flexural Strength: 18.9 MPa; Standard Dev.: 3.72 MPa.

Example 40

200 g water, 120 g W.G., 4 g glycerol, 3 g citric acid, 100 g sawdust. Processed as Example 39 except that sawdust added all at once and mixed at #1 setting for 10 min.

Example 41. as Example 40.
Example 42. as Example 41.
Example 43 as Example 42.
Example 44. Processed as Example 43.
Example 45. as Example 44.
Addition of Bentonite Clay

Example 46

200 g water, 120 g W.G., 100 g bentonite, 4 g glycerol. Water and glycerol mixed in a beaker; wheat gluten and bentonite mixed separately. The two were added together and mixed in the Globe mixer for 10 minutes on #3. Mixture was not dry enough to put through sheeter.

Example 47

200 g water, 120 g W.G., 50 g bentonite, 50 g sawdust, 4 g glycerol. Bentonite and sawdust mixed separately, the remaining ingredients mixed together; everything mixed in Globe mixer for 10 minutes. Material not strong enough to maintain shape.

Example 48

200 g water, 120 g W.G., 25 g bentonite, 200 g sawdust, 4 g glycerol. Ingredients mixed as in Example 47, then 165 g water added along with an additional 100 g of wheat gluten. Not sheeted.

Example 49

200 g water, 120 g W.G. 100 g sawdust, 40 g bentonite 4 g glycerol. Ingredients mixed as Example 48, but material was sheeted.
Example 50 As Example 49.

Example 51

As Example 50, except 50 g bentonite and sawdust was added gradually. Ultimately 10 g of water were added, as mix was too dry to sheet properly. Gradually batch came to behave as Examples 49-50.
Example 52 As Example 51

Example 53

200 g water, 120 g W.G, 100 g sawdust, 4 g glycerol. Mixed as in 24, with the exception that the material was dusted with bentonite clay during the sheeting process. This caused the surface of the material to dry more evenly and helped in the forming process.

The wheat gluten, whether in dough or powder form, encapsulates the fibers and forms pores. In some embodiments, the final product can absorb water over time, in some instances swelling and increasing in density (in some instances to or above a density of 1, where it sinks in water). In these instances, however, the article may be dried, and substantially all of the water removed, returning the article to its original condition without any permanent damage. The article returns to its low-density form and will float again.

Applicants have also found that additional components such as urea, organic acids such as but not limited to lactic acid and citric acid, preservatives such as but not limited to sorbic acid, and chemical intermediates such as but not limited to maleic anhydride, or combinations thereof may also be used. These components may be present at about 0.1% to about 10% by weight of the composition. In some embodiments, one or more of these components is present at about 1% to about 5% by weight. In some embodiments urea is present in a formaldehyde-free form, and preferably as an aqueous solution of urea, e.g., 3M urea in water. These formulation are particularly well-suited for wood composite applications.

In some embodiments, the composition comprises:
Less than about 15% wheat gluten;
about 85% to 95% reinforcing fiber; and
optionally less than about 5% urea.
In some embodiments, the composition comprises:
about 10% wheat gluten; and
about 90% reinforcing fiber.
In some embodiments, the composition comprises:
about 8 to about 10% wheat gluten;
about 88% to about 92% reinforcing fiber; and
about 1% to about 4% urea.
In some embodiments, the composition comprises:
about 6% to about 10% wheat gluten;
about 80% to about 90% reinforcing fiber; and about 6% to about 10% lactic acid.

EXAMPLES

Series A (Wood Composites)

Examples A1-A8

The specimens were prepared by first mixing the reinforcement fibers with water or the liquid additive, and then adding the wheat gluten powder. In some cases, two liquids or a liquid and a solid additive were used. A Cuisinart® food processor was used to mix the ingredients, although other types of mixers could be used (e.g. a rotary drum mixer). By adding the water or liquid to the fibers and blending BEFORE combining with the wheat gluten powder, both a uniform distribution and adequate adhesion of the gluten powder to the wood fibers are achieved. In this series of experiments, the weight ratio of commercial wheat gluten to reinforcement fiber was held constant at 0.1:1. Compression molding was used to mold 10 cm×10 cm plaques. The same processing conditions, applied load: 3.5 MPa, temperature set point: 330 F (166° C.) and total molding time: 6 minutes were used in this study, although other molding methods and processing conditions may be used. On average, it took 2.5 to 3 minutes for the press to reach its set point temperature of 330 F.

Notably, the addition of urea allows for the use of significantly less wheat gluten while maintaining or improving mechanical properties. The reduction of the amount of wheat gluten significantly reduces costs without loss of quality.

Example A1

Ingredients that went into mixture: 30.00 g pine wood chips (Uniboard Canada, Inc.), 2.81 g water, 3.00 g commercial wheat gluten (Roquette Freres, Lestren, France)
Molded 5 plaques (28 specimens tested for flexural strength/stiffness)

Example A2

Ingredients that went into mixture: 30.00 g pine wood chips (Uniboard Canada, Inc.), 3.33 g 3M urea in water, 3.00 g commercial wheat gluten (Roquette Freres, Lestren, France)
Molded 8 plaques (39 specimens tested for flexural strength/stiffness)

Example A3

Ingredients that went into mixture: 30.00 g pine wood chips (Uniboard Canada, Inc.), 2.81 g water, 0.65 g lactic acid, U.S. P. (J. T. Baker), 3.00 g commercial wheat gluten (Roquette Freres, Lestren, France)
Molded 2 plaques (11 specimens tested for flexural strength/stiffness)

Example A4

Ingredients that went into mixture: 30.00 g pine wood chips (Uniboard Canada, Inc.), 3.33 g 3M urea in water, 0.65 g lactic acid, U.S. P. (J. T. Baker), 3.00 g commercial wheat gluten (Roquette Freres, Lestren, France)
Molded 2 plaques (11 specimens tested for flexural strength/stiffness)

Example A5

Ingredients that went into mixture: 30.00 g pine wood chips (Uniboard Canada, Inc.), 2.81 g water, 0.65 g sorbic acid, 99% (Alfa Aesar), 3.00 g commercial wheat gluten (Roquette Freres, Lestren, France)

Molded 2 plaques (11 specimens tested for flexural strength/stiffness)

Example A6

Ingredients that went into mixture: 30.00 g pine wood chips (Uniboard Canada, Inc.), 3.33 g 3M urea in water, 0.65 g sorbic acid, 99% (Alfa Aesar), 3.00 g commercial wheat gluten (Roquette Freres, Lestren, France)

Molded 2 plaques (6 specimens tested for flexural strength/stiffness)

Example A7

Ingredients that went into mixture: 30.00 g pine wood chips (Uniboard Canada, Inc.), 2.81 g water, 0.65 g maleic anhydride, 98+% (Alfa Aesar), 3.00 g commercial wheat gluten (Roquette Freres, Lestren, France)

Molded 2 plaques (12 specimens tested for flexural strength/stiffness)

Example A8

Ingredients that went into mixture: 30.00 g pine wood chips (Uniboard Canada, Inc.), 3.33 g 3M urea in water, 0.65 g maleic anhydride, 98+% (Alfa Aesar), 3.00 g commercial wheat gluten (Roquette Freres, Lestren, France)

Molded 3 plaques (12 specimens tested for flexural strength/stiffness)

Mechanical Testing: Flexural Strength & Modulus

Plaques were cut into test specimens using a table saw to strips of 1.1-1.5 cm in width and 9.5-10.0 cm in length. The test specimens were conditioned at 70% humidity and 70° C. F for 24 hours prior to testing. Flexural tests were conducted using an Instron model 1125 in accordance with modified ASTM D790 flexural test. The gauge length was set at 62 mm and the crosshead speed was 10 mm/min.

Figure 1:
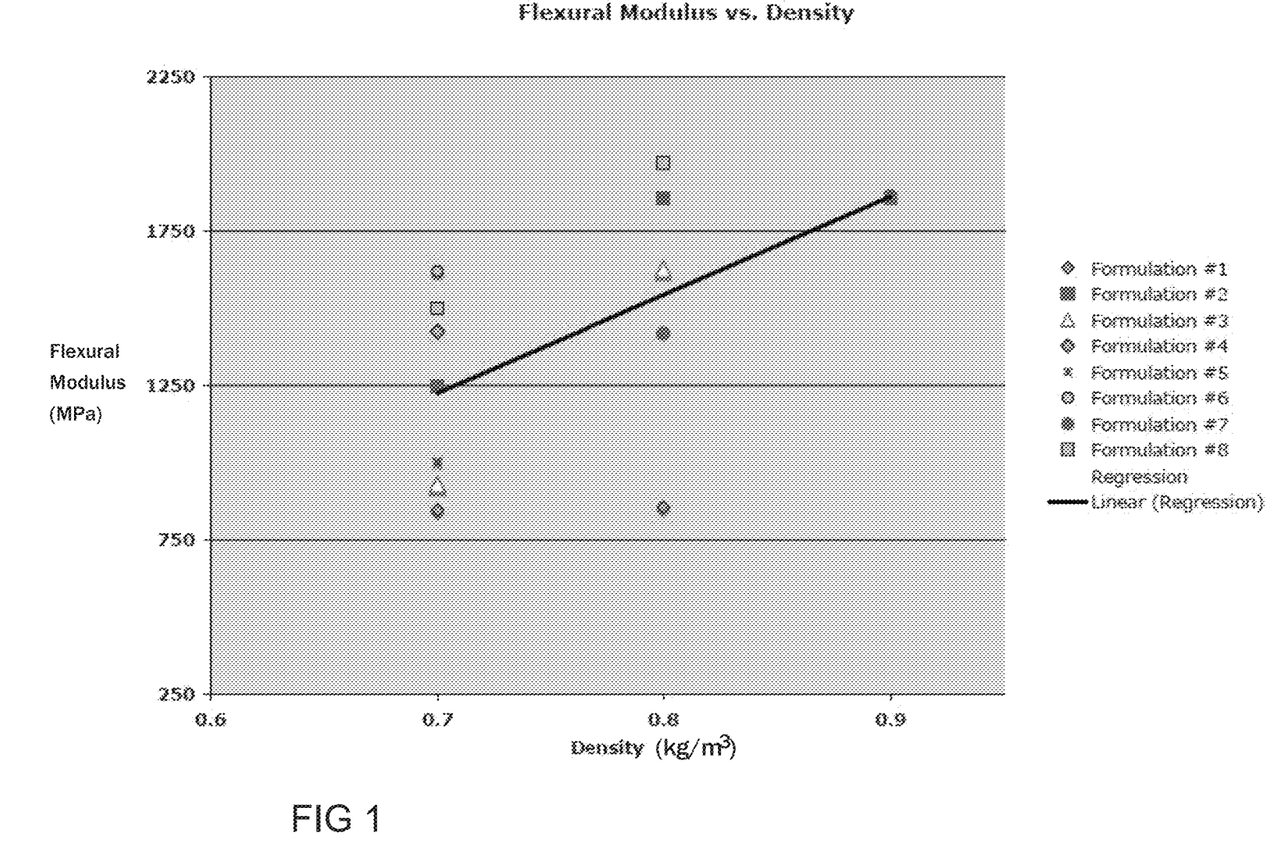
FIG. 1 is a graph depicting Flexural Modulus as measured in samples made in accordance with some embodiments described herein.
Figure 2:
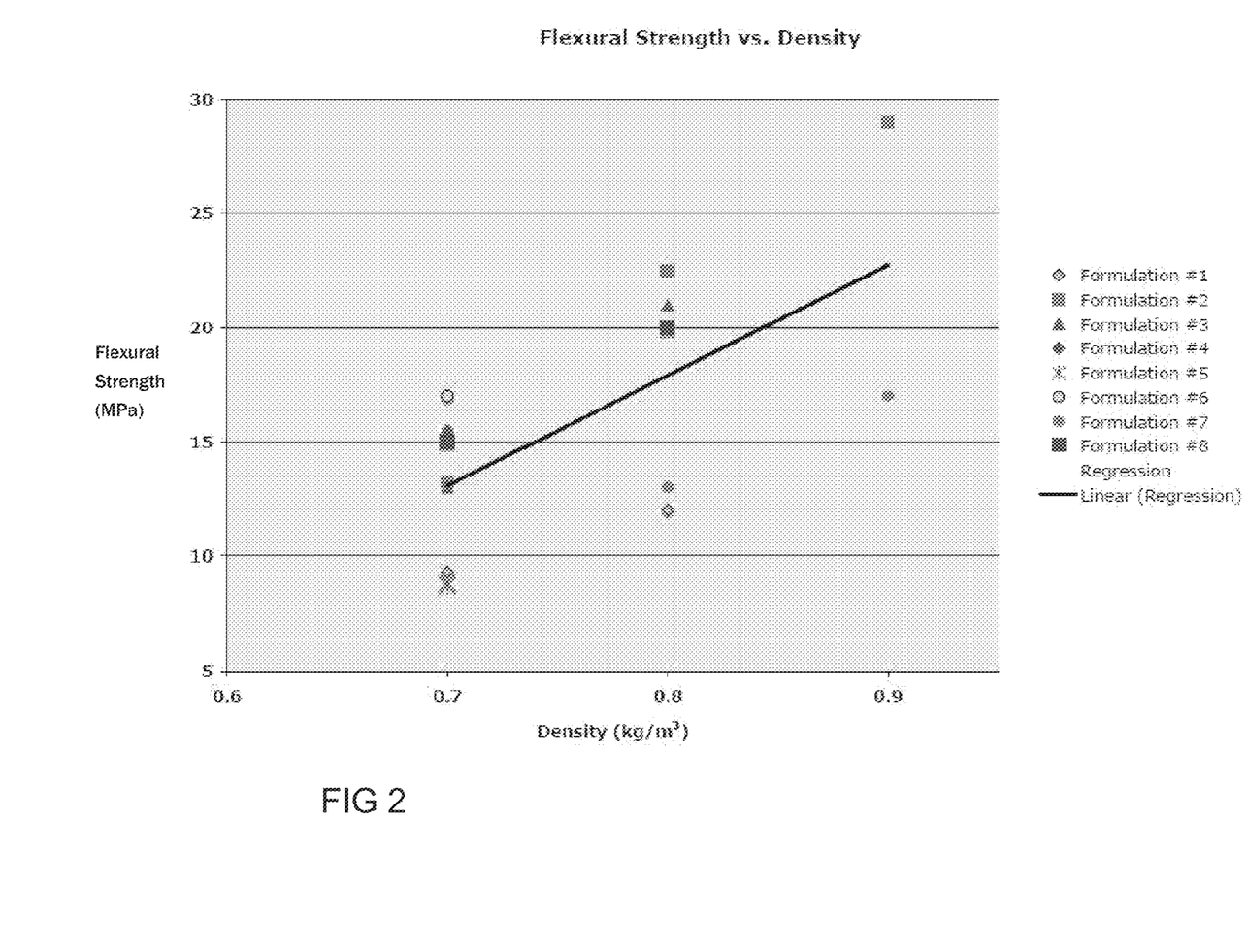
FIG. 2 is a graph depicting Flexural Strength as measured in samples made in accordance with some embodiments described herein.

FIGS. 1 & 2 (and Table 1) show flexural modulus and flexural strength measurements as a function of density for examples A1-A8. The data presented in Table 1 are also depicted graphically in FIGS. 1 & 2.

TABLE A1

| Example | n | Average Flexural Modulus | Std Dev | Average Flexural Strength | Std Dev | Density |
|---|---|---|---|---|---|---|
| A1 | 22 | 844.8 | 314.8 | 9.3 | 4.0 | 0.7 |
| A1 | 6 | 854 | 330.9 | 12 | 5 | 0.8 |
| A2 | 17 | 1247 | 493.7 | 13.2 | 5.9 | 0.7 |
| A2 | 16 | 1855 | 499.5 | 22.5 | 6.9 | 0.8 |
| A2 | 6 | 1854 | 557.7 | 29 | 10.2 | 0.9 |
| A3 | 6 | 1625 | 395.9 | 21 | 6.4 | 0.8 |
| A3 | 6 | 927 | 205.9 | 13 | 4.8 | 0.7 |
| A4 | 11 | 1423 | 505.4 | 15.5 | 7.3 | 0.7 |
| A5 | 11 | 1002 | 569.3 | 8.8 | 4.0 | 0.7 |
| A6 | 6 | 1618 | 560.4 | 17 | 6.3 | 0.7 |
| A7 | 6 | 1416 | 351.4 | 13 | 4 | 0.8 |
| A7 | 6 | 1860 | 658.5 | 17 | 6.1 | 0.9 |
| A8 | 6 | 1969 | 550.2 | 20 | 7.3 | 0.8 |
| A8 | 6 | 1498 | 549.9 | 15 | 5.5 | 0.7 |

Although the flexural modulus depends greatly on the density of the wood composite, from these data, it is clear that formulations that contain urea (A2, A4, A6, and A8) are all biased high from a statistical standpoint relative to the average (see linear regression in FIG. 1.) This suggests that the addition of urea, in even small amounts, will lead to notable increases in flexural modulus.

Maleic anhydride appears to contribute to flexural modulus in the presence of urea (A8). Applicants believe this may also be true for the addition of lactic acid and sorbic acid. As seen in FIG. 2, the addition of maleic anhydride in the absence of urea (A7) appears to outperform other formulations that do not contain urea (A1, A3, & A5).

Similarly, although flexural strength depends strongly on density of wood composite, formulations that contain urea (A2, A4, A6, and A8) are all biased high from a statistical standpoint. Formulations that contain lactic acid (both with and without urea, A4 and A3 respectively) are also biased high statistically relative to the average (see linear regression in FIG. 2.).

However, under the conditions of this experiment, the presence of the preservative, sorbic acid (A5 & A6), does not appear to have an impact on flexural strength. Notably, formulation A5, which does not contain urea, is nearly indistinguishable from base formulation A1 (wheat gluten and water), while formulation A6, which does contain urea, is indistinguishable from A2 (wheat gluten and 3M aqueous urea).

The efficiency of wheat gluten as an adhesive increases significantly if used in conjunction with water and a denaturant such as at the proper ratios. Suitable denaturants include but are not limited to guanidine hydrochloride, urea, sodium dodecyl sulfate, ammoniumtetramethylenedithiocarbamate, ammoniumpyrrolidonedithocarbamate, tetramethylammoniumbromide, pentaalkylammoniumbromidehexaethyl surfactants, and combinations thereof. In particular, guanidine hydrochloride and urea are well suited for us in the compositions described herein. Wheat gluten protein is unique in that it readily exhibits tack (or adhesion) at room temperature when it is combined with water or other polar solvents such as water, lactic acid, glycerol, dilute acids and bases, ethylene glycol, diethylene glycol, polyethylene glycol, and combinations thereof. The key is to use these (or similar) additives sparingly and judiciously, so that the natural adhesive properties of wheat gluten are not compromised and the overall cost of the system remains competitive.

In the preparation of liquid-based soy protein adhesives by others, a reducing agent, such as sodium bisulfite, is sometimes added to the water prior to introducing soy flour into the system, before the entire mixture is heated to temperatures above 80° C., in order to improve the properties of the adhesive. This represents an important difference between the soy protein work and the wheat gluten based embodiments described herein: When either sodium bisulfite or sodium sulfite was used in place of urea, the hydrated wheat gluten mixture immediately lost its characteristic adhesive properties.

As discussed above, the approach described herein involves forming the wheat gluten-based adhesive directly on the fibers (e.g., wood) themselves, as this enables one to avoid many of the problems associated with liquid, protein-based adhesive systems. Storage and stability are no longer an issue, because wheat gluten can be stored as a dry powder until use, and the adhesive system can be formed instantaneously at room temperature upon mixing the components. Furthermore, we have shown that it is possible to initiate natural crosslinking within wheat gluten without having to subject wheat gluten to extreme conditions (e.g., to prolonged heat or acid treatment). We have also observed that the room temperature curing process can be further enhanced by applying compression to the mat once the fibers (e.g., wood) have been coated with adhesive, particularly in the manufacture of particle board.

Particle board can be manufactured without synthetic chemical crosslinkers, and can still meet basic performance requirements (internal bond strength) as specified in ANSI 208.1.

Figure 3:
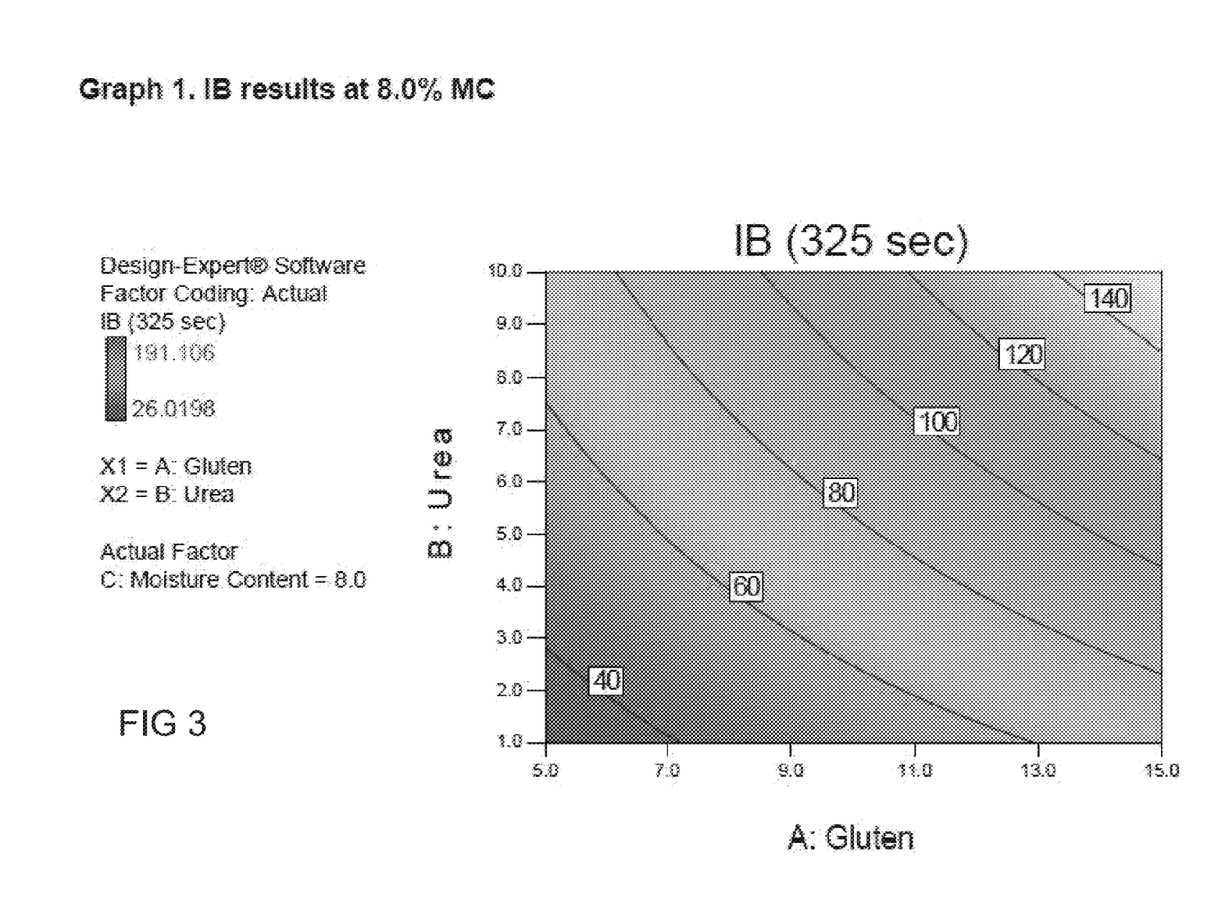
FIG. 3 is a graph depicting the internal bond strength as a function of wheat gluten and urea content as measured in samples mad in accordance with some embodiments described herein.
Figure 4:
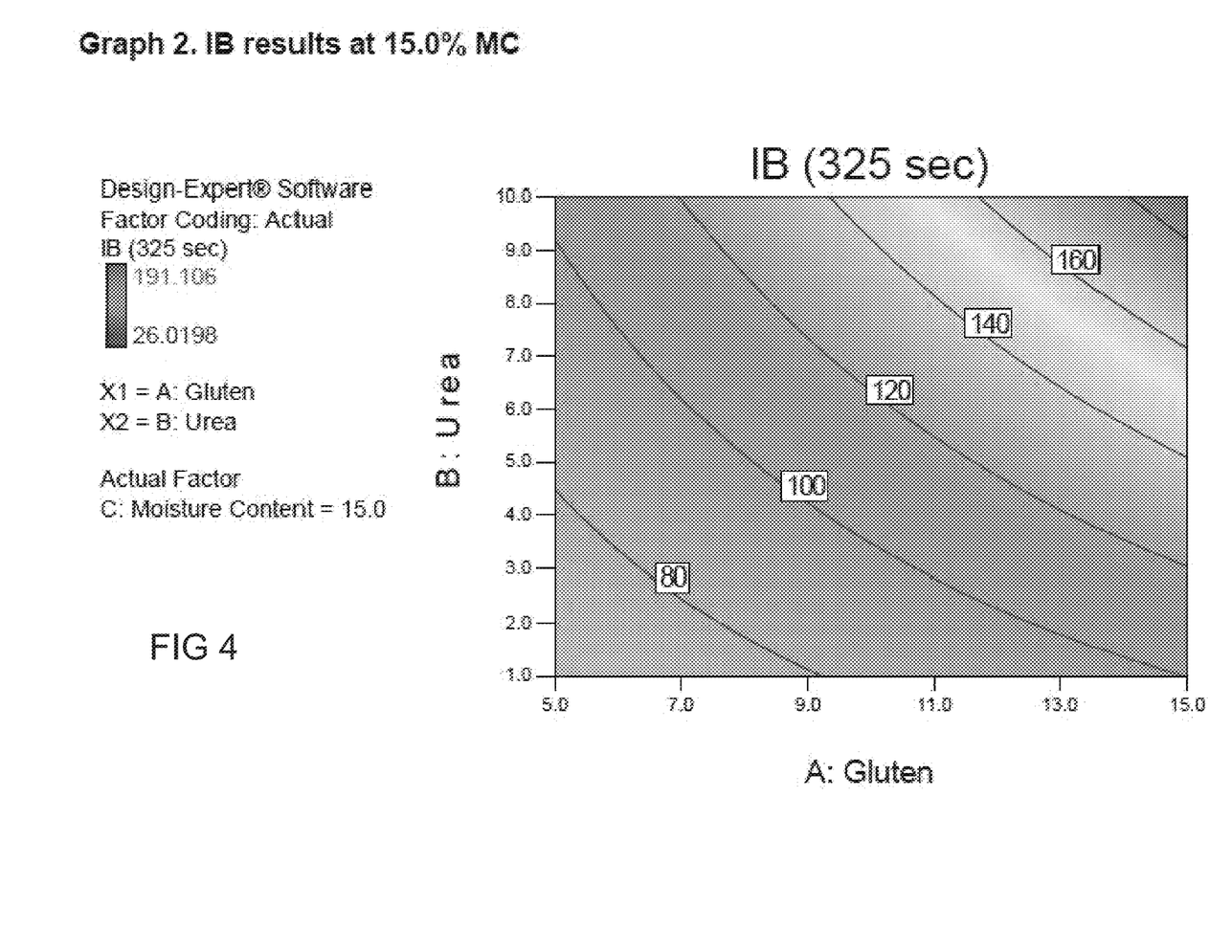
FIG. 4 is a graph depicting the internal bond strength as a function of wheat gluten and urea content as measured in samples mad in accordance with some embodiments described herein.
Figure 5:
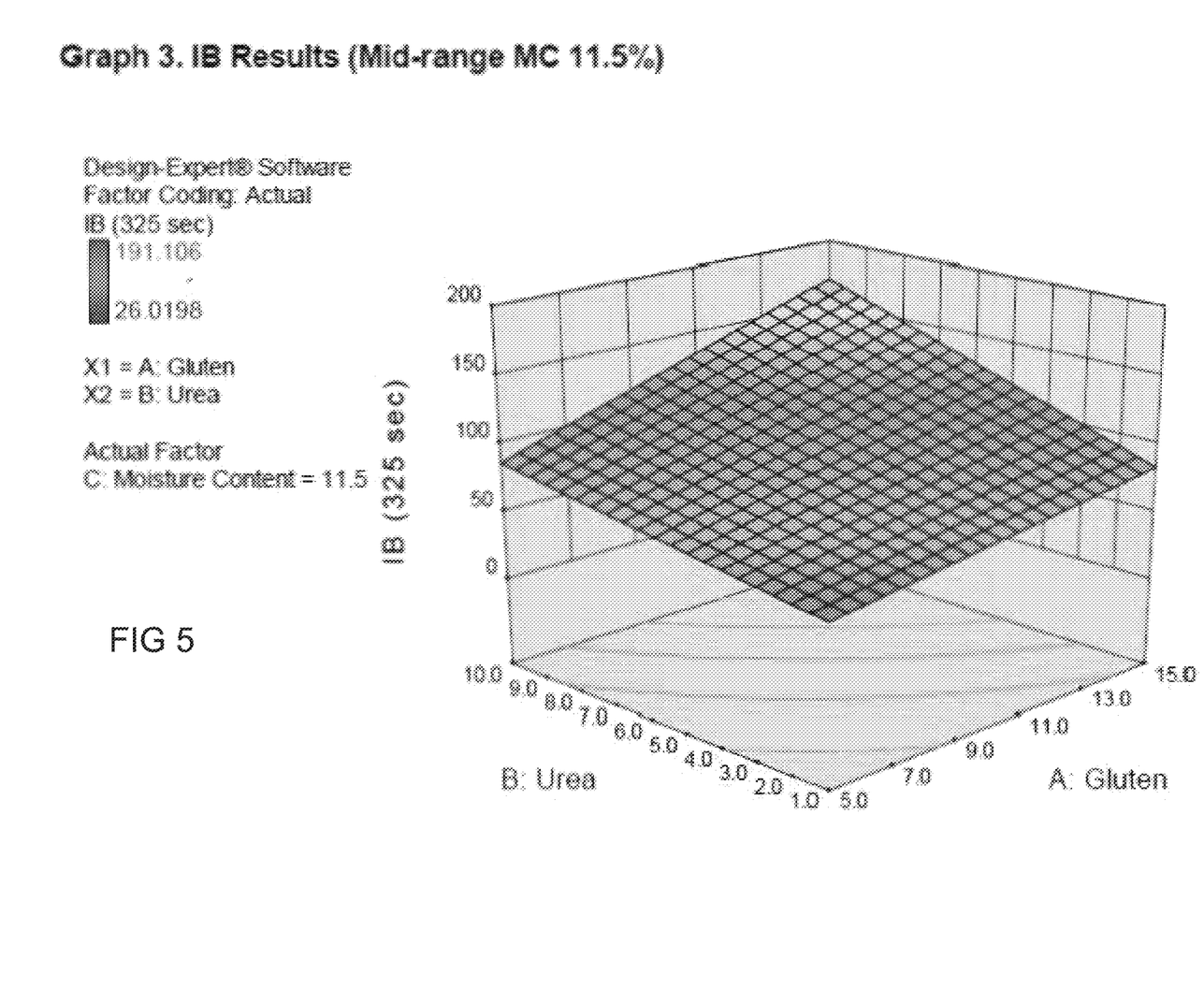
FIG. 5 is a graph depicting the internal bond strength as a function of wheat gluten and urea content as measured in samples mad in accordance with some embodiments described herein.

A summary of experiments is provided in the table below. Two boards were produced at each set of conditions. After the tests were complete, 2-D and 3-D maps were generated to illustrate the effects of % urea content, % gluten content, and % initial moisture content (MC) on the internal bond (IB) strength of the final part. The maps are found in FIGS. 3-5.

|     | % s/odw | | Blended Moisture | | % in composition | | | |
| --- | --- | --- | --- | --- | --- | --- | --- | --- |
| Run | Gluten | Urea | Content | Fiber | Gluten | Urea | Moisture | Fiber |
| 1 | 15 | 1 | 15 | 100 | 11.45% | 0.76% | 11.45% | 76.34% |
| 2 | 10 | 5.5 | 11.5 | 100 | 7.87% | 4.33% | 9.06% | 78.74% |
| 3 | 10 | 0 | 11.5 | 100 | 8.23% | 0.00% | 9.47% | 82.30% |
| 4 | 5 | 10 | 15 | 100 | 3.85% | 7.69% | 11.54% | 76.92% |
| 5 | 10 | 5.5 | 17.4 | 100 | 7.52% | 4.14% | 13.09% | 75.24% |
| 6 | 10 | 5.5 | 11.5 | 100 | 7.87% | 4.33% | 9.06% | 78.74% |
| 7 | 10 | 5.5 | 11.5 | 100 | 7.87% | 4.33% | 9.06% | 78.74% |
| 8 | 5 | 1 | 15 | 100 | 4.13% | 0.83% | 12.40% | 82.64% |
| 9 | 10 | 13.1 | 11.5 | 100 | 7.43% | 9.73% | 8.54% | 74.29% |
| 10 | 1.6 | 5.5 | 11.5 | 100 | 1.35% | 4.64% | 9.70% | 84.32% |
| 11 | 5 | 10 | 8 | 100 | 4.07% | 8.13% | 6.50% | 81.30% |
| 12 | 15 | 10 | 8 | 100 | 11.28% | 7.52% | 6.02% | 75.19% |
| 13 | 10 | 5.5 | 11.5 | 100 | 7.87% | 4.33% | 9.06% | 78.74% |
| 14 | 10 | 5.5 | 5.6 | 100 | 8.26% | 4.54% | 4.62% | 82.58% |
| 15 | 10 | 3 | 11.5 | 100 | 8.03% | 2.41% | 9.24% | 80.32% |
| 16 | 15 | 1 | 8 | 100 | 12.10% | 0.81% | 6.45% | 80.65% |
| 17 | 15 | 10 | 15 | 100 | 10.71% | 7.14% | 10.71% | 71.43% |
| 18 | 18.4 | 5.5 | 11.5 | 100 | 13.59% | 4.06% | 8.49% | 73.86% |
| 19 | 5 | 1 | 8 | 100 | 4.39% | 0.88% | 7.02% | 87.72% |
| 20 | 10 | 2 | 11.5 | 100 | 8.10% | 1.62% | 9.31% | 80.97% |

Experimental Overview:

The effects of % gluten (s/odw), % urea (s/odw), and % moisture on final part performance were investigated.

s/odw is % solids over oven-dried wood. The term is common in the particle board industry, and represents the percentage of a particular ingredient as a percentage of the amount of dry wood particles used. Thus, 5 grams of wheat gluten powder added to 100 grams of dry wood particles would be 5% s/odw wheat gluten.

A 50% (w/v) stock urea solution was prepared. The urea solution was applied to the wood particles as an atomized mist in a drum blender. After the urea solution was applied to the wood, the wheat gluten powder was added and all the ingredients were mixed for several minutes. Thus, as mentioned above, the wheat gluten adhesive is formed directly on the wood, i.e., fibers. Afterwards the mixed ingredients were added to a box and a flat surface was used to form a consolidated mat of uniform density. A hot press was then used to compress the mat to a target thickness and complete the curing process under the processing conditions presented in the table below. These examples were processed at Arclin Performance Applied Laboratory, Saint-Thérèse, Québec, Canada

| Wood | Medium Particles |
| --- | --- |
| Panel Construction | Homogenous |
| E-Wax Content | 1.0% (S/Odw) |
| Targeted Thickness | 12.3 mm |
| Targeted Density | 700 Kg/m³ |
| Board Size | 343 mm × 343 mm |
| Press Time | 325 Seconds |
| Platen Temperature | 200° C. |

The left side of the table provides data on the composition as % s/odw, where by definition, the fiber content is 100%, as measured at Arclin Performance Applied Laboratory, while the right hand side presents the calculated comparable percentages by weight of the composition consistent with the remainder of this application, for a more direct comparison. (Unless otherwise noted, all references to percent herein are to percent by weight of the composition.)

Additional additives, such as waxes, anti-microbials, etc. and combinations thereof may be added in effective amounts. Waxes, such as but not limited to hydrocarbon waxes, hydrocarbon resins, ester-based waxes, ester-based resin, montanic acid wax, E-wax, may be added at about 0.5% to about 3% wax/odw, about 0.5% to about 1% wax/odw. Non-toxic anti-microbials, such as but not limited to sorbic acid and its salts, such as sodium sorbate, potassium sorbate, and calcium sorbate, as well as essential oils such as cinnamon oil, clove oil, eucalyptus oil, garlic, oregano oil, lavender oil, leleshwa oil lemon oil, lemon myrtle oil, mint oil, neem oil, nigella sativa (black cumin) oil, onion oil (allium cepe), phytoncides, peppermint oil, sandalwood oil, sideritis or greek mountain tea, tea tree oil, thyme oil or combinations thereof, may be added in effective amounts, typically less than 1.0% anti-microbial/odw. In some instances from about 0.1% to about 0.5% anti-microbial/odw. These additives generally do not affect internal bond strength.

The table below presents Internal Bond Strength (IB) measurements for a variety of formulations described herein.

| % gluten/odw | % lactic acid/odw | % urea/odw | % guanidine/odw | % moisture content/odw | % E-wax/odw | Internal Bond Strength (IB) (psi) |
|---|---|---|---|---|---|---|
| 10 | 10 | | | 8.7 | 1 | 103 |
| 10 | 10 | | 5 | 8.9 | 1 | 129 |
| 10 | 10 | | | 9.7 | | 110 |
| 8 | 8 | | | 8.9 | | 100 |
| 6 | 6 | | | 8.7 | | 81 |
| 10 | | 5 | | 6.0 | 1 | 50 |
| 10 | | 5 | | 11.0 | 1 | 102 |
| 10 | | | | 14.8 | 1 | 27 |
| 10 | | | 5 | 10.0 | 1 | 82 |

As can be seen from these results, with the addition of urea, internal bond strength can be maintained or improved even with reduced levels of what gluten. For example, a panel with about 13.0% s/odw wheat gluten and 1.0% s/odw urea would have comparable internal bond strength to a panel with about 5% s/odw wheat gluten and 7.5% s/odw urea, see e.g. FIG. 3 following the IB curve for 60 psi. Or for example at about 7% s/odw wheat gluten, we see that at about 1.0% s/odw urea, IB is about 40 psi. Increasing urea content, i.e. traveling up the graph, to about 5% s/odw yields an IB of about 60 psi, and increasing urea further to about 10% s/odw yields an IB of about 80 psi. Maintaining IB while minimizing wheat gluten reduces the amount of wheat gluten required for satisfactory internal bond strength. That is, the desired strength can be achieved with less wheat gluten.

In some embodiments, a wheat gluten based wood product can be formed from a composition comprising:
about 15% or less of wheat gluten;
about 0.5% to about 10% denaturant, such as but not limited to urea and guanidine hydrochloride;
less than about 15% moisture; and
70% to about 90% fibrous material, such as but not limited to wood particles.

In some embodiments, a wheat gluten based wood product can be formed from a composition comprising:
about 15% or less of wheat gluten;
about 0.5% to about 10% urea;
less than about 15% moisture; and
70% to about 90% fibrous material, such as but not limited to wood particles.

In some embodiments, the composition comprises:
about 1% to about 14% wheat gluten;
about 0.5% to about 10% urea;
about 4% to 15% moisture content; and
about 70% to about 90% fibrous material, such as but not limited to wood particles.

Some embodiments include an article formed from such a composition including but not limited to board materials, particle board, etc.

Some embodiments provide particle board comprising:
about 15% or less of wheat gluten;
about 0.5% to about 10% denaturant, such as urea;
less than about 15% moisture; and
70% to about 90% fibrous material, such as but not limited to wood particles.

Some embodiments provide particle board comprising:
about 5% to about 15% wheat gluten; about 7-13% urea; and
moisture content between about 7% to about 13%.

The relative amounts of each, relative to the amount of wood particles can be adjusted to balance performance versus cost. Generally, the more gluten, urea, and water yields grater internal bond strength and a stronger final particle board. These ingredients, however, add to the cost. Wax is also helpful in manufacturing and to the final product, but does not appear to impact internal bond strength.

All references, including but not limited to articles, texts, patents, patent applications, and books, cited herein are hereby incorporated by reference in their entirety.

What is claimed is:

1. A method of making board material, the method comprising: mixing wood particle material with a liquid to yield a first resultant mixture, wherein the liquid consists of an aqueous solution containing a denaturant selected from urea or guanidine hydrochloride; mixing the first resultant mixture with about 15% or less (s/odw) wheat gluten to yield a second resultant mixture; and shaping and curing the second resultant mixture in a heated press at a maximum of 200° C. into a formed board having a minimum interfacial bond strength of 60 psi. and a target density of at least about 700 kg/m³.

2. The method of claim 1, wherein said shaping and curing comprises compressing and heating the second resultant mixture.

3. The method of claim 1, wherein the mixing occurs at a ratio to yield about 15% or less of wheat gluten; about 0.5% to about 15% denaturant; less than about 15% moisture; and 70% to about 90% wood particles in the board material.

* * * * *